United States Patent [19]

Scholl et al.

[11] 4,371,096

[45] Feb. 1, 1983

[54] CONTROL APPARATUS FOR PRESSURIZED GAS/LIQUID SYSTEMS

[75] Inventors: Charles H. Scholl, Vermilion; Paul S. Frates, Brunswick, both of Ohio

[73] Assignee: Nordson Corporation, Amherst, Ohio

[21] Appl. No.: 30,461

[22] Filed: Apr. 16, 1979

[51] Int. Cl.³ .......................... F04C 1/14; F04C 15/04
[52] U.S. Cl. .................................. 222/190; 222/255; 222/318; 222/334; 418/15; 261/DIG. 26
[58] Field of Search ............... 222/318, 333, 334, 190; 418/15; 261/DIG. 26; 239/124, 127; 521/917

[56] References Cited

U.S. PATENT DOCUMENTS

| | | | |
|---|---|---|---|
| 2,800,365 | 7/1957 | Hodges | 222/318 X |
| 4,059,714 | 11/1977 | Scholl et al. | 366/301 X |
| 4,154,368 | 5/1979 | Gusmer et al. | 222/146 HE X |
| 4,200,207 | 4/1980 | Akers et al. | 222/190 |

Primary Examiner—Joseph J. Rolla
Assistant Examiner—Frederick R. Handren
Attorney, Agent, or Firm—Wood, Herron & Evans

[57] ABSTRACT

Control apparatus for purging the pressure in conduits or hoses of pressurized gas/liquid systems such as hot melt foam generating equipment. The control includes a selectively actuable "purge valve" which upon actuation applies an output pressure to reverse the direction of rotation of the motor driving the gas/liquid mixing pump, or alternatively to operate a diverter valve that connects the pump outlet side back to the liquid supply line. Simultaneously, the purge valve cuts off the supply of gas to the mixing pump. The control desirably also includes a selectively actuable "start-up valve" for supplying gas to the gas/liquid mixing pump at higher than normal operating pressure, in order to overcome any internal blockage and prime the pump for starting operation.

27 Claims, 2 Drawing Figures

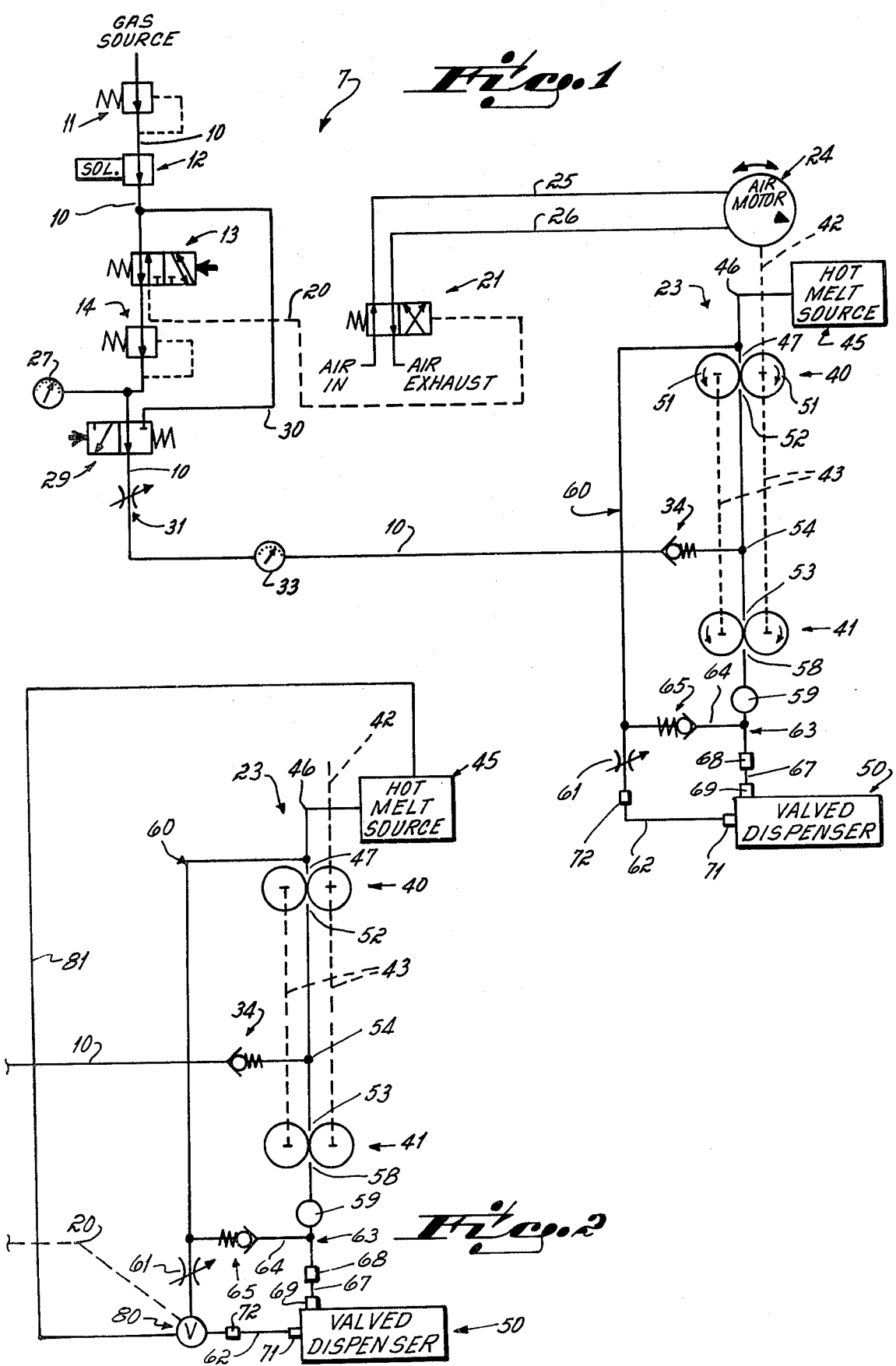

CONTROL APPARATUS FOR PRESSURIZED GAS/LIQUID SYSTEMS

This invention relates to means for controlling pressurized gas/liquid systems. More particularly, it relates to control apparatus for purging the pressure in pressurized conduits containing gas/liquid mixtures, as in hot melt adhesive foam generating equipment, and for providing increased pressures for start up of such systems.

BACKGROUND OF THE INVENTION

As taught in Scholl et al U.S. Pat. No. 4,059,714, issued Nov. 22, 1977, entitled "Hot Melt Thermoplastic Adhesive Foam System", in many instances it is useful to apply hot melt adhesives in foam condition. Such foams can be generated by dispersing a gas into liquid hot melt, for example by a gear pump, to form a gas/hot melt mixture in which the gas may be in true solution in the liquid, or it may be dispersed as tiny microbubbles. The gas/liquid mixture is conveyed under pressure from the mixing apparatus through a pressurized conduit, line or hose to a valved dispenser, which may be a gun or a foam dispensing head. Upon dispensing to atmosphere the pressure is released and the gas expands within the liquid to create the foam. A pressurized return or recycle line is usually provided to recirculate the mixture back through the pump, when the dispenser is not dispensing it. In such systems the gas/liquid mixture may be quite hot, and under substantial pressure in the lines. For example, in a hot melt foam generating system the temperature may be on the order of 175° F. to 350° F. for most hot melt adhesives, and the pressure is often on the order of 200 to 500 psi and may be as high as 1500 psi.

It is occasionally necessary to disconnect the delivery and/or return conduits between the pump and the valved foam dispensing head, for example to change or clean the head, replace a worn hose, or for cleaning or servicing and the like. In the past, disconnection of the pressurized conduits in systems containing such gas/liquid mixtures has been a slow, difficult and to some extent even dangerous operation, while the gas/liquid mixture in the conduits is under substantial pressure. The conduits act as accumulators because of the pressurized gas they contain. If that pressure is released abruptly, as when a threaded hose coupling is opened, it expels the mixture rapidly, even violently when the pressure is high, and the mixture blows out of the conduit. (In this respect pressurized gas/liquid systems differ from hydraulic systems, in which the liquid pressure drops very rapidly upon opening a conduit, with little discharge of viscous contents when the pumping means is deenergized.) Because of the heat content, uncontrolled discharge of hot melt adhesive is a safety hazard and unacceptable in an industrial environment. Moreover, because of its high viscosity, the upstream pressure in the conduit drops slowly, and thereby prolongs discharge of the material.

Prior to this invention, it was difficult to rapidly and safely release or "purge" the pressure in pressurized gas/liquid conduits, especially if the liquid contains a large quantity of gas or if the gas has a tendency to remain in admixture with the liquid, as is the case with hot melt adhesives. If a valved outlet is placed in the line and is opened to atmosphere to release the pressure, the material will eject through that valve as a foam around it, which is difficult to handle; moreover, even though the pump is not running, high viscosity of the liquid results in only a slow pressure drop so that material continues to exude for some time. One end of a long hose may still be at substantially higher pressure even though the other end is open. In any event, the "blow out" of material from the hose is wasteful and messy. In practice, this persistence of pressure in a hose, even after the pump has been stopped, has made disconnection of pressure conduits slow, difficult and dangerous. Thus, substantial need has existed for a means of purging the pressure in a controlled, rapid, and safe manner, so that the conduit may be disconnected.

BRIEF DESCRIPTION OF THE INVENTION

The present invention is directed to a selectively operable control apparatus whereby pressure in the system may be purged quickly, safely and without waste of material. The control apparatus includes a selectively actuable "purge valve" which, when actuated, operates valve means in the system to purge pressure. At the same time, operation of the purge valve cuts off the supply of gas from the gas supply to the mixing pump and thereby terminates further generation of gas/liquid mixture. In the preferred embodiment, actuation of the purge valve applies a pressure signal that operates a reversing valve to reverse the direction of flow through the system. The control apparatus preferably also includes a pressure reducing valve and a selectively actuable start-up valve for bypassing the pressure reducing valve in order to supply gas from the gas source to the mixing pump without the reduction in pressure that would otherwise be established by the pressure reducing valve. This provides super-charging or priming of the mixing pump with higher density gas in order to overcome any initial blockage and to start the flow of gas into the system.

In the preferred embodiment, the pressure signal from the purge valve is applied to actuate a four-way reversing valve which reverses the flow of operating fluid through an air motor that drives the gas/liquid mixing pump. Reversal of operation of the air motor reverses the direction of fluid flow in the system, and fluid is drawn from the pressurized conduits and pumped back to the liquid source where it is exposed to atmospheric pressure, so that the foam dissipates. In an alternative embodiment of the invention, the pressure signal from the purge valve is applied to operate a diverter valve in the system which releases pressure in the lines directly back to tank, without reverse pumping.

The invention can best be further described and its operation explained by reference to the accompanying drawing, in which, FIG. 1 is a schematic illustration of control apparatus in accordance with a preferred embodiment of the invention, as connected in a first mode of use to a hot melt foam system having a two-stage pump; and FIG. 2 is a schematic illustration showing a second mode of use.

In the drawings and in this explanation, the invention is described with particular reference to use with hot melt foam systems. However, it is noted more generally that the control apparatus of this invention is useful with other systems wherein gas/liquid mixtures are pumped under pressure and wherein it is desirable to purge the pressure, including for example systems for applying foam coatings.

In FIG. 1 the preferred form of control apparatus is designated generally by 7. The control apparatus includes a gas supply line 10 which in use is connected to a gas source that may comprise a gas cylinder, a compressed air system, or the like. The gas supply usually will include a pressure regulator valve 11 such as the pilot operated spring biased valve shown. This valve is set to maintain a desired gas pressure from the supply.

Gas line 10 of control 7 includes an off-on valve 12 which may be solenoid operated. This valve is desirably interconnected with the electrical control system for the hot melt liquid supply, so that it is opened only when the hot melt supply pump is energized.

Downstream in the direction of gas flow from off-on valve 12 the gas line 10 is connected to a selectively operable pressure purge valve 13. For normal foam generating operation valve 13 is biased to connect line 10 to a second pressure reducing or regulating valve 14 which controls the pressure of the gas being delivered to the pump which in turn determines the density of the foam. Valve 13 may be spring biased to this position, as shown. Upon selective actuation, as indicated by the arrow shown at the right of valve 13, that valve disconnects the gas source from valve 14 and connects the gas source to a pilot pressure line 20.

In the preferred mode of use shown in FIG. 1, pilot pressure line 20 is connected to operate valve means 21 for reversing the direction of rotation of the pump 23 which pressurizes the gas/hot melt or other liquid mixture. In the embodiment shown, actuation of purge valve 13 from its normal position reverses the direction of pump 23 by reversing the direction of rotation of the air motor 24 which drives pump 23. Pump 23 is driven by air motor 24 which is supplied with air under pressure from a source indicated at "air in", through a reversing valve 21 which is responsive to the actuation of purge valve 13. The reversing valve 21 is desirably a four-way valve which upon actuation reverses the application of pressure between the motor inlet and exhaust lines 25 and 26. Biasing means such as the spring illustrated urges reversing valve 21 to a first position such that air from the pressure source is supplied through line 25 to air motor 24, to cause it to rotate in a first direction of rotation. The air motor exhaust passes through line 26 and valve 21. When purge valve 13 is selectively actuated, the gas pressure from line 10 of control apparatus 7 is applied as a pilot pressure through line 20 to actuate reversing valve 21 against the biasing spring, so that the operating pressure is supplied to motor 24 through line 26 and exhaust air is relieved through line 25. This reversal of the connections to the air motor causes it to reverse its direction of rotation, and in turn drives the pump 23 in its opposite direction.

Returning to the description of control apparatus 7, the foam density control valve 14 comprises an adjustable pressure regulating valve which may be a pilot pressure operated, spring biased pressure relief valve. A gauge 27 indicates this pressure on the downstream side of valve 14. In use, valve 14 is set to establish a desired gas pressure which is lower than valve 11 at the source. This valve controls pressure of the gas going to pump 23, and thus controls the density of the gas which in turn determines the density of the foam which is generated when the gas/liquid mixture is dispensed.

Downstream of valve 14, gas conduit 10 is connected to a start-up valve 29 which on actuation functions to bypass purge valve 13 and density regulator 14. In the normal operating position shown, start-up valve 29 connects the outlet of valve 14 to pump 23; when actuated, for example manually or by a solenoid, start-up valve 29 establishes a bypass around density control valve 14, through a bypass line 30 that leads from conduit 10 upstream of density regulator 14 and also preferably upstream of pressure purge valve 13 as shown. This bypass in effect avoids the reduction in gas pressure that would otherwise be established at valve 14; it delivers gas at the higher pressure established by gas source pressure regulator 11. A brief application to pump 23 of such higher pressure is desirable to start flow of gas into the liquid stream into which it is to be mixed by the pump. An indicator 33 measures the gas flow in line 10, downstream of an adjustable restrictor 31. The gas is supplied to pump 23 through a check valve 34, which permits flow of gas in conduit 10 toward, but not hot melt flow from, the pump.

The control 7 is useful with single stage pumps as well as multiple stage pumps. In the embodiment illustrated, pump 23 is a two-stage pump of the specific type disclosed in the copending application of Akers and Scholl, Ser. No. 874,333, filed Feb. 1, 1978 titled "Hot Melt Adhesive Foam System," now U.S. Pat. No. 4,200,207 assigned to the same assignee as this application. It should be understood, however, that the invention is not limited to that particular pump, or to two-stage pumps in general, and that it may be used with single stage pumps. The invention can also be used with electric motor driven pumps.

Briefly, pump 23 as shown includes a first stage gear metering pump 40 which meters the hot melt or other liquid to a second stage gear mixing pump 41. The gas is introduced into the liquid stream between the two stages, as described more fully in the Akers and Scholl application, the disclosure of which is incorporated herein by reference. Second stage pump 41 has larger capacity than the first stage pump, in order to accommodate the additional volume of the gas. Air motor 24 drives the first stage through suitable drive means, as indicated schematically by the dashed line 42. The gears of the two stages are preferably coupled to rotate in synchronism, as indicated by the dashed lines at 43.

The hot melt or other liquid to be mixed with the gas is supplied from a source 45 which may comprise a conventional hot melt supply or the like, for example as shown in U.S. Pat. No. 4,059,714, previously referred to. The hot melt is delivered from source 45 through a line 46, to the gear chamber of first stage pump 40, through an inlet port 47. For normal pump operation, i.e., to pump the liquid to the second stage 41, the gears of the first stage are driven by the motor 24 in the direction of rotation indicated by the arrows 51. In such operation the gear teeth are just coming out of engagement at liquid inlet 47. The rotating gears convey the liquid to the first stage pump outlet 52, from which it flows to the inlet 53 of second stage pump 41. Gas from line 10 is introduced through a gas inlet port 54. In the second stage 41, the gas and liquid are mixed and the gas may actually be dissolved in the liquid. The second stage outlet side 58 may include a filter as at 59 for removing any entrained solid particles from the mixed, pressurized gas/liquid stream. (The filter may be as shown in U.S. Pat. No. 3,224,590, issued Dec. 21, 1964.) A heated pressure hose 67 connects the second stage pump outlet to valved dispenser 50 from a manifold 63. The valved dispenser 50 may be a conventional fixed dispensing head, for example as taught in Baker et al reissue patent No. Re 27,865, reissued Jan. 1, 1974, titled "Applicator Having A Fixed Module With Static Parts And A Removable Module With Moving Parts," or it may be a hand-held foam gun. This hose or conduit 67 is connected at one end to the pump outlet and at the other end to the dispenser by releasable couplings, as at 68 and 69.

A recirculation passage 60 including a circulation valve in the form of an adjustable orifice 61 leads from valved dispenser 50 back to the first stage pump inlet 47. The pump output stream is recirculated from dispenser 50 back to the pump when the dispenser is closed and is not dispensing the mixture. A suitable construction for recirculation valve 61 is disclosed in Akers et al application Ser. No. 874,333, previously referred to. A bypass line 64 is connected internally in the manifold 63 between second stage pump outlet 58 and passage 60, and includes a check valve 65. Passage 60 will usually include a pressure recirculation hose 62 similar to supply hose 67, with disconnectable couplings as at 71 and 72.

While it is operating, the pump 23 maintains the gas/liquid mixture under pressure in the hoses 67 and 62; and even when the pump is not operating, the pressure in the hoses decays only very slowly. If any hose or the valved dispenser is to be uncoupled, the hose or pipes coupled to it must be opened and, even though the pump has been stopped, pressure may persist for an undesirably long time. Because of the gas content, the entire pressurized system acts as an accumulator and, when a coupling 68, 69, 71 or 72 is opened, this pressure causes the fluid to spew out.

The control apparatus 7 of this invention enables the pressure in the connecting hoses or conduits to be purged quickly and safely. In the preferred mode of utilizing the control 7, this is accomplished by cutting off the supply of gas to the pump gas inlet 54 and simultaneously reversing the direction of rotation of the air motor 24 and thereby reversing the direction of operation of pump 23. Such reversal causes movement of the gas/liquid mixture through the system in the direction opposite to the normal direction of flow; tests have established that this procedure rapidly relieves the pressure, for example, in 2–5 minutes in a hot melt foam system of the type described.

More specifically, when it is desired to purge the pressure, purge valve 13 is actuated, manually or mechanically. This cuts off the admission of gas through line 10 to the hot melt at the pump and instead diverts the gas pressure from the source as a pilot pressure signal through pilot line 20 to reversing valve 21, which it shifts. This actuation of the reversing valve reverses the direction of rotation of air motor 24 and drives pump 23 in the opposite direction from normal.

The normal outlet sides of both the first and the second stage pumps now become the respective inlet sides. Pump 41 delivers the gas/liquid mixture from port 58 to port 53 and back through pump 40. This fluid already contains the gas and the liquid, and apparently the gas is not dissociated from the liquid by the reverse flow through the pump, but is allowed to expand. Since the dispenser 50 is closed, it is believed that the pre-existing pressure in hoses 62 and 67 causes the mixture to be drawn into pump 41. The fluid delivered to port 47 by reverse operation of pump 40 returns to tank through line 46, and the hoses are thereby substantially drained so that pressure is then reduced to atmospheric pressure or even below. In the embodiment shown, wherein pump 23 is that shown in the previously mentioned Akers et al patent application Ser. No. 874,333, pump 40 preferentially directs the fluid to the hot melt source 45 rather than recirculating it reversely through line 60, since the opening to the recirculation line (illustrated at 86 in FIG. 2 of the Akers et al application) is relatively restricted as compared to the opening to the source. In actual practice with gas/hot melt mixtures, it is found that recirculation line 60 is in fact substantially drained by the purging procedure, indicating that the flow is directed toward the source rather than being drawn back through line 60.

After a short period of time, which can readily be established for a given system and material and which may be of the order of roughly about two–five minutes for a typical hot melt, the conduit pressure has been purged to a tolerably low level. The purge valve may then be released or reset to normal "run" position. Thus, in comparison to the previous practice which has provided no safe and easy way of releasing system pressures, this invention enables the system and particularly the conduits or hoses to be depressurized simply, safely, and quickly, merely by operating the purge valve 13.

Moreover, by reason of the reverse flow established in hose 67 during purging, fluid flows reversely through filter 59, thereby back flushing it and dislodging any solid particles collected on it. Once removed from the filter, it is desirable to drain such particles through the conventional manifold drain valve so that they are not thereafter recirculated in the system.

As already indicated, apart from its use to purge pressure, control 7 can also be used to provide a higher-than-normal start-up pressure, to prime pump 41 with the gas. This is desirable where a viscous or solidified material in pump 41 blocks intake of gas through port 54, so that no gas can be injected into the liquid. To overcome such blockage, the control provides for selectively bypassing pressure reducing valve 14, to supply gas at the (higher) upstream source pressure. For this operation, at start up the liquid supply is energized to melt the adhesive. Solenoid valve 12 is energized so that pressure is supplied from the gas source at regulated pressure into line 10 of the control 7. With pump 23 operating, actuation of start up or bypass valve 29 bypasses reducing valve 14 and supplies gas at the higher (unreduced) pressure from gas source 11. This higher pressure (which for example may be of the order of 40 psi for a hot melt system of the type shown) helps to overcome any internal blockage. Once the flow of gas through pump 41 has started (as manifested by delivery of foam through the gun), start-up valve 29 can be released to normal run position. Gas thereafter flows from the source at the normal operating reduced pressure established by the density regulator valve 14.

FIG. 2 illustrates a second mode of connecting control 7 to the gas/liquid system. The gas/liquid system may be otherwise similar to that shown in FIG. 1, but the control pilot line 20 operates a diverter valve 80 in the system that directs the pump output from manifold 63 back to the liquid source 45 where the gas escapes as the liquid is recirculated.

For this purpose a normally closed air pressure operated diverter valve 80 is connected to return the flow from line 62 directly back to tank (source) via a line 81. This valve 80 may be similar to the valve designated generally at 50 in Baker et al Re. No. 27,865, to which reference may be had for a more complete description. Normally it is biased closed by a spring; when purge valve 13 is operated, its output pressure signal in line 20 is applied to shift the movable valve element of valve 80 and open a path for flow from manifold 63 directly to the return passage 81. Actuation of purge valve 13 simultaneously cuts off supply of gas to the mixing pump. The already mixed fluid is thus returned to the tank, where the gas dissipates. In this system the purging operation does not require reversal of the pump and no reversing valve is necessary; as can be seen, rather than operating a reversing valve, the pilot pressure signal from the pump valve operates the diverter valve 80, to release line pressures.

Yet another mode of utilizing the invention requires neither pump reversal nor operation of a diverter valve. In this mode, actuation of the purge valve merely cuts off the admission of gas to the mixing pump. The adjustable circulation valve 61 is opened to present minimal pressure drop and the air motor is adjusted so that pump 23 is run at a slow rate. With no gas supplied to second stage pump 41 and gun 50 closed, the gas-containing mixture in the hoses 67 and 62 is displaced slowly by the incoming liquid which contains no gas. The displaced gas/liquid mixture from hose 67 is returned to tank via return recirculation line and supply line 46. In this case the system gradually changes from a gas/liquid mixture-containing system, to a hydraulic system which, as already noted, does not present the problem of persistent accumulated gas pressure.

When the gas/liquid mixture is returned to tank, the gas separates from the liquid at a rate depending on the nature of the liquid. The foam tends to rise to the surface of the tank, and the liquid supplied to the pump through line 46 contains a diminishing quantity of gas.

The foregoing disclosure illustrates various modes of using the control of this invention to dissipate or purge system pressures in gas/liquid systems, and to facilitate system start up. From the description it will be understood that the invention is not limited to the specific embodiments disclosed, but that the invention can be incorporated in other embodiments within the scope of the following claims.

What is claimed is:

1. Control apparatus for purging pressure in a system wherein a gas/liquid mixture is pumped under pressure, the system being of the type including a rotary pump which mixes the gas and the liquid together and delivers the mixture thereof under pressure through a conduit to a valved dispenser, said control apparatus comprising,
   a gas line for conveying said gas from a source to said pump,
   a purge valve in said gas line selectively actuable to cut off the supply of said gas to said pump, and
   means for reversing the direction of rotation of said pump to reverse the direction of flow of said mixture therethrough, said reversing means being responsive to the actuation of said purge valve,
   the reverse operation of said pump substantially reducing the pressure in said conduit.

2. The apparatus of claim 1 wherein said pump is driven by a fluid motor and
   wherein said reversing means comprises
   means for reversing the direction of rotation of said fluid motor, thereby to reverse the direction of rotation of said pump.

3. The apparatus of claim 2 further wherein the direction of rotation of said fluid motor is reversed by actuation of a reversing valve which reverses the direction of flow through said motor,
   said purge valve when actuated to cut off the supply of gas to said pump simultaneously actuating said reversing valve.

4. The control apparatus of claim 3 wherein said reversing valve is a pilot pressure operated four-way valve, and
   said purge valve when actuated applies the pressure of said gas from said line as the pilot pressure to actuate said reversing valve.

5. The apparatus of claim 1 wherein said apparatus further includes
   a pressure reducing valve in said gas line, and
   selectively operable bypass means for bypassing said pressure reducing valve to supply gas from said source to said pump without the pressure drop established by said pressure reducing valve.

6. The apparatus of claim 1 wherein said pump is a two-stage pump comprising a first stage pump for metering said liquid and a second stage pump for mixing said liquid and gas to form said mixture, said gas being admitted from said line to said second stage pump.

7. The apparatus of claim 1 wherein said pump delivers said mixture to a valved dispenser through a pressurized hose, said hose being connected between said pump and said valved dispenser by releasable couplings.

8. The apparatus of claim 1 wherein said pump delivers the pressurized gas/liquid mixture to a conduit through a filter, and wherein the reversing of said pump reverses the flow through said filter and thereby back flushes the same.

9. The apparatus of claim 1 wherein a pressurized recirculation line connects said valved dispenser back to said pump,
   the operation of said purge valve also purging the pressure in said recirculation line.

10. The apparatus of claim 9 wherein said recirculation line returns the mixture from said valved dispenser to a liquid supply line leading from a source of said liquid to said pump,
    said recirculation line joining said supply line through a restricted passage so that reverse flow from said pump in said liquid supply line is directed preferentially to said liquid source, rather than to said recirculation line.

11. The apparatus of claim 1 further including a source of liquid hot melt adhesive connected to feed said pump.

12. The apparatus of claim 1 including passage means through which said mixture is returned to a reservoir at atmospheric pressure when said pump is reversed.

13. The apparatus of claim 12 wherein said reservoir is a hot melt heater, from which said liquid is supplied to said pump.

14. Control apparatus for use with a system wherein a gas/liquid mixture is pumped under pressure, the system being of the type including a rotary pump which mixes the gas and the liquid together and delivers the mixture thereof under pressure through a conduit to a valved dispenser,
    said control apparatus including
    a gas line for conveying said gas from a source to said pump,
    a purge valve in said gas line selectively actuable to cut off the supply of said gas to said pump and simultaneously to actuate valve means for purging pressure in said system,
    a pressure reducing valve in said line for reducing the pressure of gas supplied therethrough to said pump, and
    a bypass valve selectively actuable to bypass said pressure reducing valve, thereby to apply said gas to said pump at a higher pressure than established by said pressure reducing valve.

15. The apparatus of claim 14 wherein said valve means comprises a reversing valve for reversing the direction of rotation of a fluid motor which drives said rotary pump.

16. The control apparatus of claim 15 wherein said reversing valve is a pilot pressure operated four-way valve, and said purge valve when actuated applies the pressure of said gas from said line as the pilot pressure to actuate said reversing valve.

17. The apparatus of claim 14 wherein said pump is a two-stage gear pump comprising a first stage pump for metering said liquid and a second stage pump for mixing said liquid and gas to form said mixture, said gas being admitted from said line to said second stage pump.

18. The apparatus of claim 14 wherein said pump delivers said mixture to a valved dispenser through a pressurized hose, said hose being connected between said pump and said valved dispenser by releasable couplings.

19. The apparatus of claim 15 wherein said pump delivers the pressurized gas/liquid mixture to a conduit through a filter, and wherein the reversing of said pump reverses the flow through said filter and thereby back flushes the same.

20. The apparatus of claim 15 wherein a pressurized recirculation line connects said valved dispenser back to said pump, the actuation of said purge valve also purging the pressure in said recirculation line.

21. The apparatus of claim 20 wherein said recirculation line returns the mixture from said valved dispenser to a liquid supply line leading from a source of said liquid to said pump, said recirculation line joining said supply line through a restricted passage so that reverse flow from said pump in said liquid supply line is directed preferentially to said liquid source, rather than to said recirculation line.

22. The apparatus of claim 14 further including a source of liquid hot melt adhesive connected to feed said pump.

23. The apparatus of claim 15 including passage means through which said mixture is returned to a reservoir at atmospheric pressure.

24. The apparatus of claim 23 wherein said reservoir is a hot melt heater, from which said liquid is supplied to said pump.

25. The apparatus of claim 14 wherein said valve means comprises a diverter valve for establishing a path that returns the output of said pump to the liquid source.

26. The apparatus of claim 25 wherein said diverter valve is operated by pressure from said gas line when said purge valve is actuated.

27. The apparatus of claim 26 wherein said diverter valve is connected between the outlet side of said pump and the inlet side thereof.

* * * * *